Figure 1:
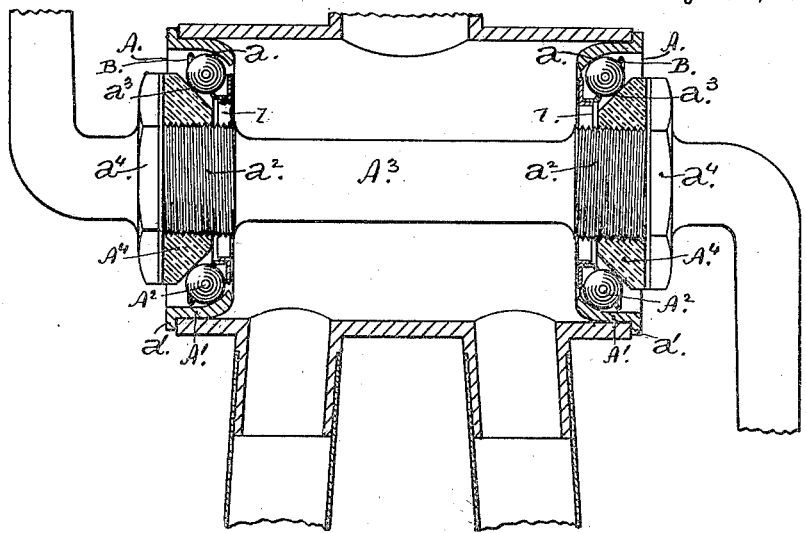

(No Model.)

H. B. KEIPER.
BALL RETAINER FOR ANTIFRICTION BEARINGS.

No. 604,678. Patented May 24, 1898.

Witnesses.
C. Emlen Urban
S. Grant Johnston

Inventor.
Henry B. Keiper
by Dan'l H. Herr,
Attorney.

United States Patent Office.

HENRY B. KEIPER, OF LANCASTER, PENNSYLVANIA, ASSIGNOR OF ONE-HALF TO JOHN HERTZLER, OF SAME PLACE.

BALL-RETAINER FOR ANTIFRICTION-BEARINGS.

SPECIFICATION forming part of Letters Patent No. 604,678, dated May 24, 1898.

Application filed October 9, 1897. Serial No. 654,649. (No model.)

*To all whom it may concern:*

Be it known that I, HENRY BRINSER KEIPER, a citizen of the United States, residing at Lancaster, in the county of Lancaster and State of Pennsylvania, have invented certain new and useful Improvements in Ball-Retainers for Antifriction-Bearings; and I do hereby declare the following to be a full, clear, and exact description of the invention, such as will enable others skilled in the art to which it appertains to make and use the same.

This invention relates to improvements in antifriction-bearings of that class in which independent ball-retainers are introduced to prevent the balls or rollers from contacting with each other and which move with said balls as they revolve in their respective races.

The object of the invention is to prevent the balls or rolling bodies from contacting with each other as they perform their functions, thereby preventing the opposing friction resulting from their rubbing against each other, as is the case in the bearings now known to the trade, and to hold the balls arranged in place, keeping them together when such bearings are taken apart for any purpose.

The elements of the invention will severally and at large appear in the following description, and they will be separately and collectively set forth in the claims.

The purposes of the invention are attained by the mechanism and devices illustrated in the accompanying drawings, similar reference characters designating like parts throughout the several views, in which—

Figure 2:
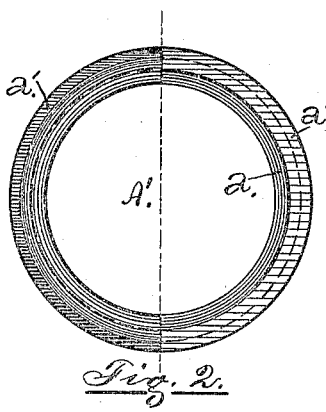
Figure 3:
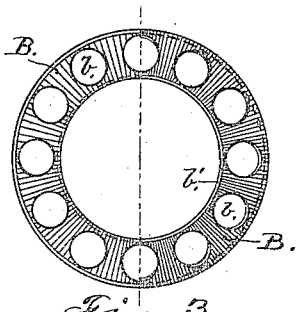
Figure 4:
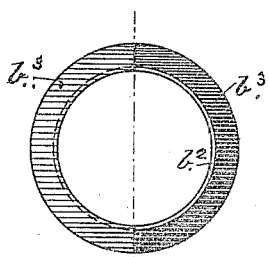
Figure 5:
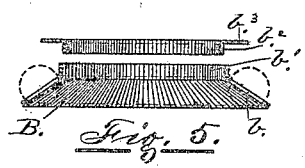

Figure 1 is a sectional view showing the elements of the invention in place in the ends of the tube of the usual bicycle-hanger. Figs. 2, 3, and 4 are plans showing halves in detail detached from Fig. 1; and Fig. 5 shows sectional elevations in detail of the ball-retainer, but the ball-apertures are omitted, except at the ends thereof, where dotted circles show two balls in place.

In the drawings, A A designate completed bearings embodying this invention, one being inserted into each end of the usual tube of a bicycle-hanger, and they may be applied with equal facility to the ends of the hub of a bicycle driving-wheel, having been reduced in size to meet the requirements of said hub. This latter fact is so evident that it was deemed superfluous to give it separate illustration.

As will be seen in the drawings, each bearing comprises a portion $A'$, shaped as shown and pushed into each end of the hanger-tube, Fig. 1, having in its inner face a ball-race $a$, in which are placed the required number of balls $A^2$, as in the ordinary bearings of this class, and at its outer end an outwardly-extending flange $a'$, which, resting against the ends of the tube, prevents said portion from entering farther thereinto.

Onto the shaft $A^3$, which may be a bolt provided at prescribed points with screw-threads $a^2$ for the purpose of holding them, are mounted approved cones $A^4$, whose sloping faces $a^3$ bear against the balls $A^2$, keeping them confined to the race $a$, before mentioned, and the cones are secured in place by jam or lock nuts $a^4$; but the cones may be secured in any other approved manner.

So far nothing new has been described or shown; but now we come to the distinctive feature, which is the life of this invention— namely, the independent ball-retainer.

A ring B, which may be flat, but in this instance it is somewhat funnel-shaped, is placed within the space between the central cone and the surrounding portion containing the ball-race $a$, being perfectly free or independent from each, moving freely with the balls and without touching either said cone or said ball-race portion, its shape being determined by the nature of the space in which it moves. In its body are formed apertures $b$, in which the balls of the bearings are seated so as to revolve freely therein, yet not capable of falling through, as is plainly indicated by the dotted lines or circles in Fig. 5. At the inner end or smaller opening of the ring B is attached one end of a prescribed tubular ring $b'$, into which is closely fitted a second tubular ring $b^2$, provided with an outwardly-projecting ring-flange $b^3$, extending to about the centers of the balls over which it is placed, keeping them in place or from falling out of the respective apertures in which they are seated.

It will here be noted, first, that the number of balls is not restricted, but is determined by the size of the bearings and the diameters of the balls it is desired to use; second, that the number of apertures $b$ in the retainer is determined by said number of balls, and they may be any desired distance apart, but there should always be a sufficient wall between them to prevent the balls from contacting with or touching each other; third, that when the balls are seated therein and the retainer in the position indicated in Fig. 1 said balls will revolve or roll between the cone and ball-race in the usual manner without rubbing against each other, thereby avoiding the usual opposing friction; fourth, that the retainer, carrying the balls as shown, moves with said balls as they perform their functions, reducing all friction to a minimum, and, fifth, that when a bearing is taken apart for any purpose whatever the retainer can be readily removed or put in place, the balls remaining in order or normal positions.

Having now described the invention and ascertained and shown the manner in which it is performed, what I consider new, and desire to secure by Letters Patent, is—

1. The combination in a ball-retainer of the character described, with a funnel-like ring having ball-seating apertures in its body and a tubular ring having one end secured thereto, of a second tubular ring securely seated in said first-mentioned tubular ring, and having an outwardly-projecting ring-flange with its inner edge securely affixed to the forward end thereof, substantially as and for the purpose hereinbefore set forth.

2. The ball-bearing comprising the portion, $A'$, having the ball-race, $a$, and the ring-flange, $a'$; the cone, $A^4$, with the ball-bearing face, $a^3$, and adapted to be secured onto a central shaft or bolt; the balls, $A^2$, moving in said race and against said face; and the independent ball-retainer comprising the funnel-shaped ring, B, having the apertures, $b$, loosely seating said balls, and the tubular ring, $b'$, having one end secured to the inner edge of said funnel-shaped ring, with the tubular ring, $b^2$, fitted into said fixed ring, $b'$, and having the outwardly-projecting ring-flange, $b^3$, secured to the forward end thereof, all substantially as described and for the purpose hereinbefore set forth.

In testimony whereof I affix my signature in presence of two witnesses.

HENRY B. KEIPER.

Witnesses:
PAUL A. HERR,
HARVEY B. LUTZ.